United States Patent [19]

Meade

[11] Patent Number: 4,989,260
[45] Date of Patent: Jan. 29, 1991

[54] TRANSMITTER WITH POWER REDUCTION TO COMPENSATE FOR VARYING RADIATED ELECTRIC FIELD STRENGTH WHEN SWITCHING BETWEEN BATTERIES AND AC POWER

[75] Inventor: James P. Meade, Hamburg, N.Y.

[73] Assignee: The Quaker Oats Company, Chicago, Ill.

[21] Appl. No.: 353,106

[22] Filed: May 17, 1989

[51] Int. Cl.$^5$ .............................................. H04B 1/034
[52] U.S. Cl. ..................................... 455/95; 455/127; 455/129
[58] Field of Search ............... 455/117, 127, 129, 270, 455/271, 272, 95, 115–116; 343/720, 702, 905; 307/22, 24, 26

[56] References Cited

U.S. PATENT DOCUMENTS

| | | | |
|---|---|---|---|
| 3,753,117 | 8/1973 | Downing et al. | 73/170 R |
| 3,873,846 | 3/1975 | Morio et al. | 307/23 |
| 4,375,701 | 3/1983 | Hanson | 455/343 |
| 4,441,031 | 4/1984 | Moriya et al. | 307/66 |
| 4,618,857 | 10/1986 | Dubois et al. | 340/654 |
| 4,636,741 | 1/1987 | Mitzlaff | 330/127 |
| 4,654,882 | 3/1987 | Ikeda | 455/129 |
| 4,747,161 | 5/1988 | Hulsey et al. | 455/108 |

FOREIGN PATENT DOCUMENTS

| | | | |
|---|---|---|---|
| 0060321 | 3/1987 | Japan | 455/127 |
| 0232222 | 10/1987 | Japan | 455/127 |

Primary Examiner—Reinhard J. Eisenzopf
Assistant Examiner—Andrew Faile
Attorney, Agent, or Firm—Cumpston & Shaw

[57] ABSTRACT

A radio frequency transmitter of the type that is adapted to be powered from an internal battery power source, or from an external power supply that is connected to the transmitter by an electrical conductor, which conductor acts as a part of the antenna system for such transmitter and increases the strength of the signal radiated by the transmitter when the transmitter is powered from the external power supply, and which includes a circuit for reducing the power output of the transmitter, when the transmitter is connected to the external power supply.

6 Claims, 1 Drawing Sheet

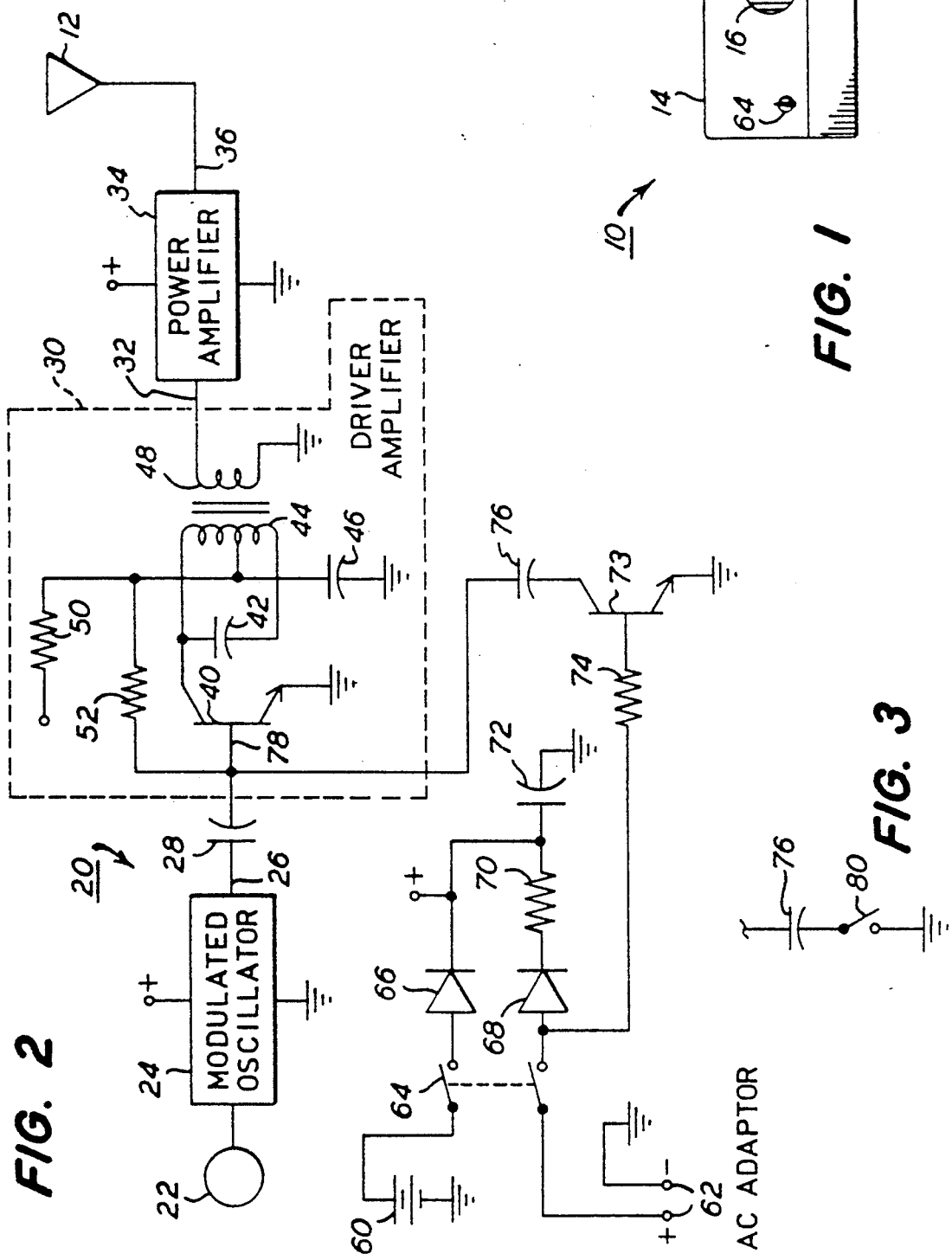

TRANSMITTER WITH POWER REDUCTION TO COMPENSATE FOR VARYING RADIATED ELECTRIC FIELD STRENGTH WHEN SWITCHING BETWEEN BATTERIES AND AC POWER

This invention relates in general to low power radio frequency transmitters, and more particularly to a low power radio frequency transmitter having an internal power supply and an optional external supply, the radiated signal from which is not increased when the transmitter is connected to the external power source by an electrical conductor that acts as part of the antenna system for such transmitter.

A low power radio frequency transmitter in combination with a compatible receiver provides a particularly effective way to aurally monitor activity in a remote location. For example, such a transmitter, if placed in an infant's or young child's bedroom, in combination with a receiver located in another room, will allow the parents of the infant to aurally monitor the infant's activities.

Frequently, such transmitters are adapted to be powered either from an internal battery, or an external power supply such as an "AC adaptor" connected to the transmitter by an electrical cable. Because the electrical cable functions to increase the length of the antenna system of the transmitter when it is connected, especially when short inefficient antennae are used, the radiated signal strength from the transmitter increases when power is derived from the external supply, even though the output power of the transmitter remains the same.

In order to meet applicable regulations for unlicensed transmitters, the strength of the signal radiated by such a transmitter must be maintained at or below a certain level, such as 80 dB/microvolt per meter at 3 meters. If the output power of the transmitter is adjusted to provide this signal strength when the transmitter is operated from its internal batteries, the maximum allowable field strength will be exceeded when the transmitter is connected to the external power source. Alternatively, if the power is adjusted to meet the maximum field strength limits when the transmitter is connected to the external source, the signal strength produced when the transmitter is powered by its internal batteries will be substantially less than is permitted, and the range of the transmitter will be unnecessarily reduced.

Accordingly, it is an object of this invention to provide a radio frequency transmitter of the type that is adapted to be powered from an internal power source, or from an external power source connected to the transmitter by an electrical conductor, which conductor functions as a part of the antenna system for such transmitter to increase the strength of the signal radiated by the transmitter when the transmitter is powered from the external power supply, which improvement includes a circuit for reducing the power output of the transmitter, when the transmitter is connected to the external power source.

While the novel aspects of the invention are set forth with particularlity in the appended claims, the invention itself, together with further objects and advantages thereof may be more readily understood by reference to the following detailed description of a preferred embodiment of the invention, taken in conjunction with the accompanying drawings, in which:

FIG. 1 is a pictorial view of a radio transmitter in accordance with this invention;

FIG. 2 is a schematic, partially in block diagram form, of a presently preferred power controller circuit in accordance with the invention; and FIG. 3 is a schematic diagram of an alternative switching circuit in accordance with the invention.

Referring now to FIG. 1, a radio transmitter indicated generally at 10 includes an antenna 12 such as a short helical resonator extending upwardly from a cabinet 14 in which the transmitter circuitry is housed. An opening 16 in the front face of cabinet 14 provides access to a microphone for picking up sounds close to the transmitter. An AC power adapter 18, adapted to be plugged into commercial AC mains, is connected to the transmitter by a two conductor electrical cable 20. Preferably, the adapter 18 contains circuits for converting the AC mains power to a low DC voltage suitable for powering the transmitter. The transmitter 10 also has an internal power source, such as a battery, which is operative to power the transmitter when it is disconnected from the external power source.

The AC power adapter and cable of this invention are per se conventional and may be of any of the many designs well known to those skilled in the art. While a preferred embodiment of this invention utilizes an adapter that has an AC to DC converter with an integral plug attached at one end of the cable, so as to supply a low voltage DC signal through the cable to the transmitter, alternative embodiments, such as an embodiment in which an AC signal is supplied to a transmitter, which transmitter would then include an AC to DC power supply within the case 14 may also be employed.

Cable 20 is detachably connected to transmitter 10 either by a connector provided at the end of the cable in combination with a mating jack on the transmitter into which the connector may be plugged, or in the alternative by providing a base into which the transmitter may be removably mounted, the base and transmitter having mating contacts for connecting the transmitter to the power source, which is permanently or detachably wired to the base.

When the transmitter is disconnected from the external power source, the antenna 12 is essentially the sole radiating portion of the transmitter system. However, when the transmitter is connected to the external power source 18 by cable 20, the cable itself acts as an additional radiating element, thereby increasing the field strength of the signal produced by the transmitter.

FIG. 2 shows a circuit in accordance with this invention for substantially equalizing the strength of the radiated signal produced by the transmitter, whether the internal or the external power source is used. The transmitter 20 includes a sensitive microphone 22 connected to a preferably crystal controlled frequency modulated overtone oscillator 24 for generating a modulated radio frequency signal at an output 26 thereof. The output 26 of modulated oscillator 24 is coupled through a capacitor 28 to a driver-amplifier 30 that amplifies the output of the modulated oscillator. The output 32 of the driver-amplifier 30 is connected to a power amplifier 34, the output 36 of which is connected to antenna 12. The modulated oscillator and power amplifier of a transmitter in accordance with this invention may take any of the forms well known to those skilled in the art.

The driver-amplifier 30 of this invention includes an RF amplifier transistor 40 having its base connected to coupling capacitor 28, its emitter connected to ground, and its collector connected to an output tank circuit that includes a capacitor 42, transformer input winding 44, and capacitor 46. The tank circuit is resonant at the desired output frequency of the driver-amplifier. The output winding 48 of transformer 44 is connected to the power amplifier 34. The collector voltage for transistor 40 is connected through resistor 50, and appropriate operating bias is provided by resistor 52 connected between the collector and base of transistor 40.

Power for the various stages of the transmitter 20 is provided in the alternative by a battery 60 or from the external power source 18, which is connected to power input terminals 62. A double pole single throw switch 64 disconnects both power sources to turn the transmitter off. First and second power diodes 66 and 68 isolate the two power sources, and a resistor 70 and capacitor 72 decouple the external source from the transmitter.

In order to simplify the drawing, the connections among the terminals labelled +have been omitted, as is conventional.

In accordance with this invention, a switching transistor 73 is connected through a base resistor 74, switch 64 and diode 68 to the positive terminal of power input 62. When the external power source is connected, transistor 73 will be turned on, preferably driven into saturation, and a shunt capacitor 76 will be connected from the base 78 of driver-amplifier transistor 40 to ground. This will reduce the level of the signal applied to transistor 40, and consequently will reduce the output of the driver-amplifier and the output of power amplifier 34. Accordingly, when the external power source is connected, the power output of amplifier 34 will be lower than when the transmitter is powered from its internal battery. By selecting capacitor 76 to produce a radiated field strength that is equal when the external power source 18 is connected and when it is disconnected, a transmitter is provided that can produce the maximum allowable signal strength when powered from either the internal or external power source.

While the invention has been described in connection with a presently preferred embodiment thereof, those skilled in the art will recognize that other means for sensing whether the external power supply source 18 is connected, and for reducing the power output of the transmitter may also be provided. For example, the operating conditions of power amplifier 34 could readily be adjusted to reduce the power output. Similarly, while the preferred embodiment of this invention reduces the power output of the transmitter by reducing the input to driver-amplifier 30 by shunting a portion of the RF signal to ground, the power output could also be reduced by changing other operating characteristics of the driver-amplifier. As an alternative to the switching transistor 73, a diode could be used. These and other methods for adjusting the power output of the transmitter that will occur to those skilled in the art are intended to be included within the scope of this invention.

In addition, while the preferred embodiment of the invention contemplates sensing the presence of the external power source by using the voltage therefrom to turn on a transistor, other methods may also be used. For example, a switch that is mechanically activated when a connector on conductor 20 is plugged into transmitter 10 may be used as shown in FIG. 3. Switch 80 is adapted to be closed when the external power supply connector is plugged in to ground capacitor 76, and to be opened when the connector is removed. These and other modifications and changes that fall within the true spirit and scope of the invention are intended to be encompassed by the appended claims.

What is claimed is:

1. In a radio transmitter of the type that is powered in the alternative from an internal power source or an external power source connected to the transmitter by an electrical conductor, and in which radiation by said electrical conductor increases the strength of the signal broadcast by the transmitter when the transmitter is powered from the external power source, the improvement comprising:

means for reducing the power output of the transmitter when the transmitter is connected to the external power source.

2. The transmitter of claim 1 comprising a modulated oscillator, a drive-amplifier coupled to the modulated oscillator, and a power amplifier coupled to the driver amplifier, in which said means for reducing the power output of the transmitter comprises switchable means coupled between said modulated oscillator and said driver-amplifier for reducing the amplitude of the signal applied to said modulated oscillator.

3. The radio transmitter of claim 1 wherein said means for reducing the power output of said transmitter comprises means for switchably connecting an impedance from a radio frequency signal path in said transmitter to ground.

4. The radio transmitter of claim 3 wherein said switchable means comprises a switching transistor having an input connected to the output of said external power source for turning on said transistor when said external power source is connected.

5. The radio transmitter of claim 3 wherein said means for reducing the power output comprises a switch means activated by connection of said electrical conductor.

6. A low power radio frequency transmitter comprising:

a modulated oscillator having an output;
a microphone connected to said modulated oscillator;
a driver-amplifier connected to said modulated oscillator by a coupling capacitor;
a power amplifier connected to said driver-amplifier;
impedance means switchably connected to the input of said driver-amplifier for shunting a portion of said input to ground;
internal battery power supplying means connected to the modulated oscillator, driver amplifier and power amplifier;
connector means coupled to the modulated oscillator, driver amplifier and power amplifier, and adapted to be connected to an external power source through a cable; and
means coupled to the connector means responsive to the connection of said external power source for connecting said impedance means to ground.

* * * * *